Nov. 6, 1934.   H. W. NEWTON   1,979,990
METHOD OF FILTER CAKE DISCHARGE
Filed Oct. 20, 1931   6 Sheets-Sheet 1

Inventor
Harry W. Newton
by Parker & Carter
Attorneys.

Nov. 6, 1934.    H. W. NEWTON    1,979,990
METHOD OF FILTER CAKE DISCHARGE
Filed Oct. 20, 1931    6 Sheets-Sheet 5

Inventor
Harry W. Newton
by Parker a Carter
Attorneys.

Nov. 6, 1934.   H. W. NEWTON   1,979,990
METHOD OF FILTER CAKE DISCHARGE
Filed Oct. 20, 1931   6 Sheets-Sheet 6
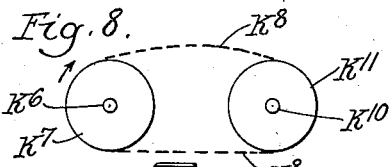
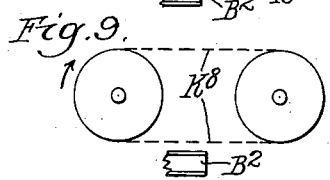
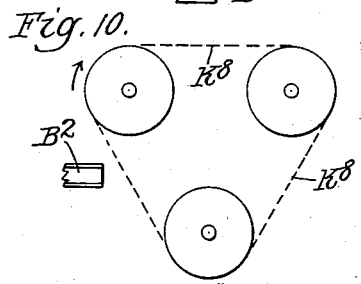
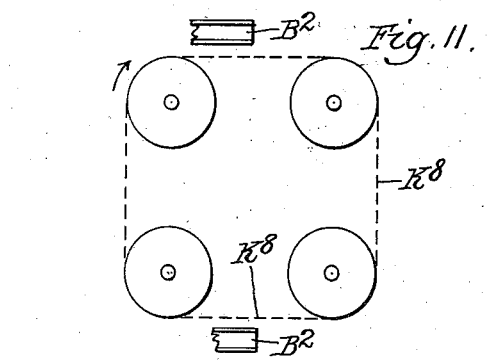
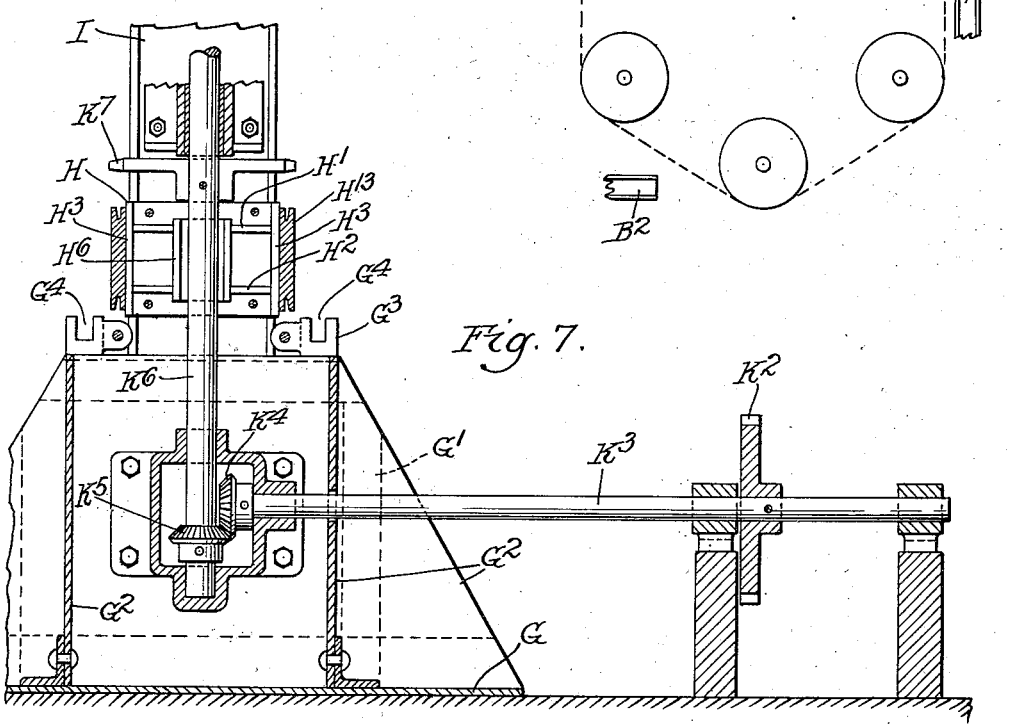
Inventor
Harry W. Newton
by Parker & Carter
Attorneys.

Patented Nov. 6, 1934

1,979,990

UNITED STATES PATENT OFFICE 1,979,990

METHOD OF FILTER CAKE DISCHARGE

Harry W. Newton, Chicago, Ill., assignor to Nordberg Manufacturing Co., Milwaukee, Wis., a corporation of Wisconsin Application October 20, 1931, Serial No. 569,963

5 Claims. (Cl. 210—196)

My invention relates to a method of filtration and has for one object the provision of an improved method for compacting or drying the filter cake after its formation or deposit upon a leaf or septum, or for reducing the moisture content of a formed filter cake. Another object is the provision of an improved method of discharging a filter cake from a leaf or septum. Other objects will appear from time to time in the course of the specification and claims.

The present application is a continuation in part of my co-pending application 555,275, filed on August 5, 1931. It will be understood that various mechanisms may be employed to carry out my method and its various steps. I illustrate herein, however, the mechanism described and claimed in co-pending application 563,791, filed on September 19, 1931 in the name of Robert Stuart Butler. It will be understood that the mechanism itself is the invention, not of myself, but of Butler, but it forms a ready means for practicing my invention.

I illustrate my invention more or less diagrammatically in the accompanying drawings, wherein:

Figure 7 is a section on the line 7—7 of Figure 2; and

Figures 8, 9, 10, 11 and 12 are diagrammatic views of various modifications of the leaf circuit.

Like parts are indicated by like symbols throughout the specification and drawings.

Figure 1:
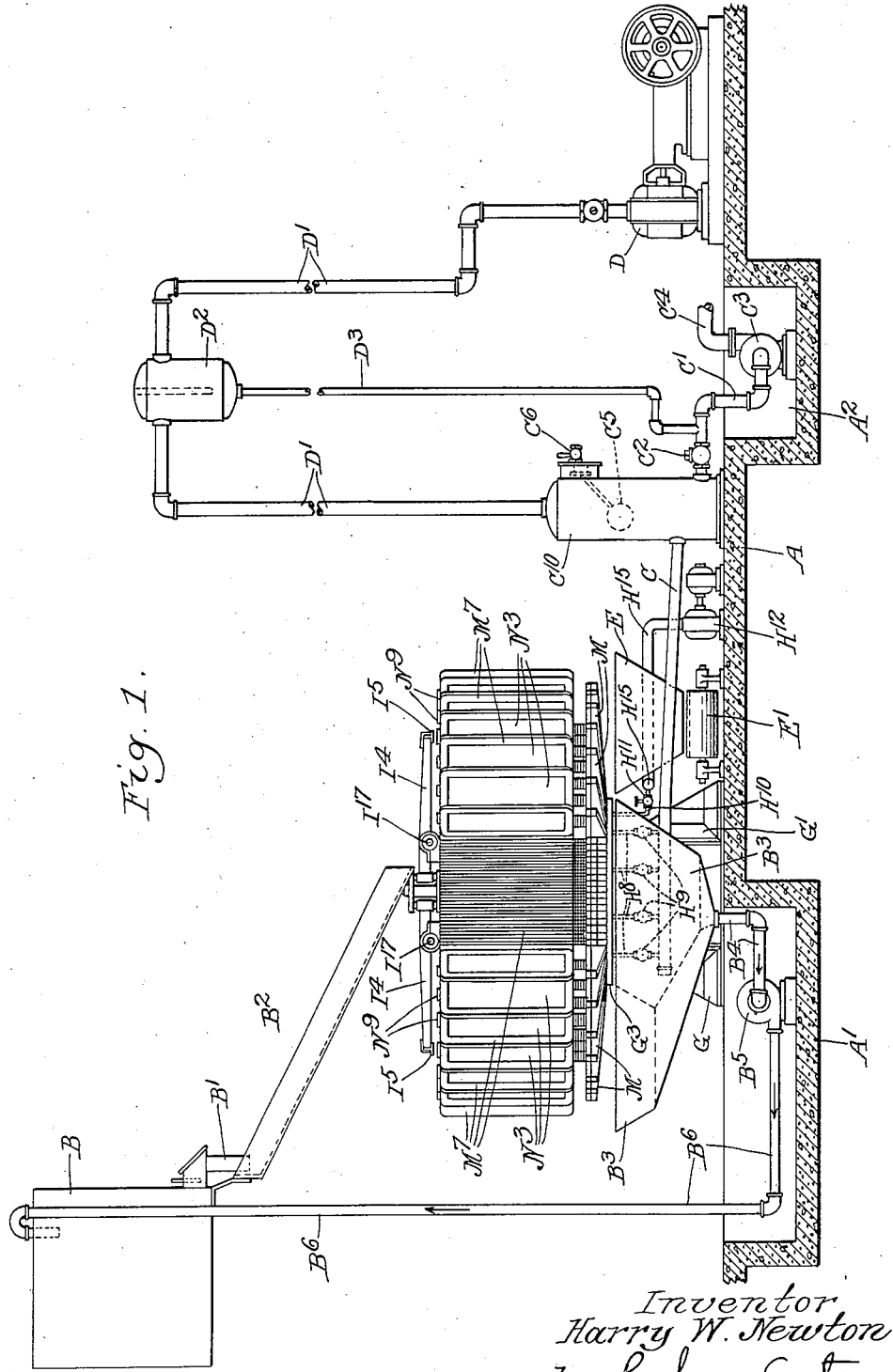
Figure 1 is a side elevation.
Figure 2:
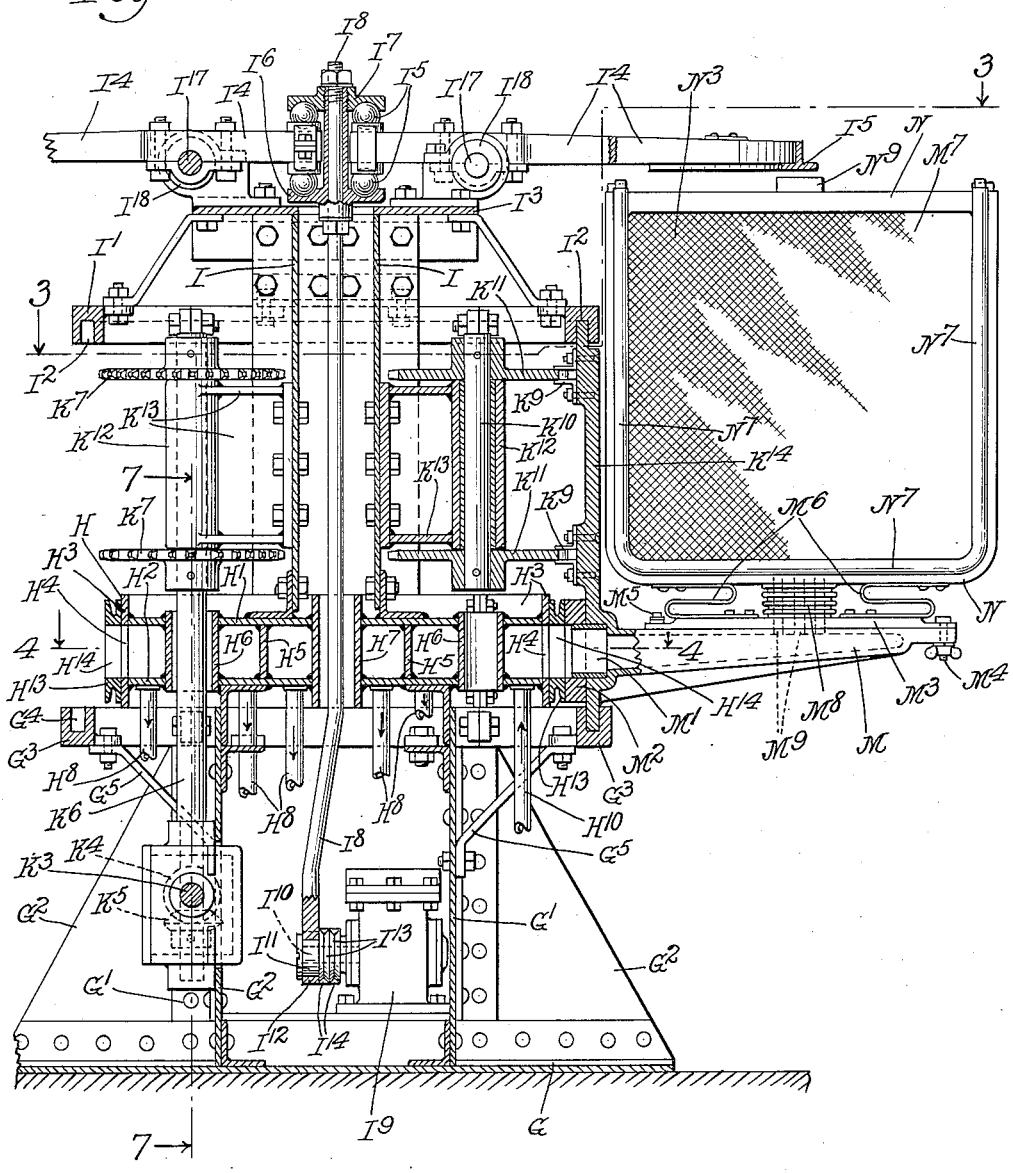
Figure 2 is a vertical transverse section.

Referring to the drawings, A generally indicates any suitable base or foundation, herein indicated as having a depression $A^1$ and a second depression $A^2$. B indicates a storage tank for the material to be filtered which may discharge, through the outlet $B^1$ through a downwardly inclined delivery trough $B^2$. $B^3$ is a hopper or a receiving member for the unfiltered liquid discharged from the below described filter. It may discharge through the passage $B^4$ to any suitable pump $B^5$ which delivers it along the passage $B^6$ to the storage tank. Thus the overflowing liquid is returned to the storage tank to be delivered again to the filter.

The filtrate delivered from the below described filter may pass through a manifold C to the filtrate receiver $C^{10}$. The filtrate is delivered from the filtrate receiver as by the passage $C^1$ controlled by a check valve $C^2$ to any suitable pump $C^3$, which delivers along the line $C^4$. $C^5$ indicates any suitable liquid level control member in the filtrate receiver $C^{10}$, which actuates a quick opening or release valve $C^6$ to the atmosphere.

Vacuum is maintained in the filtrate and filter system as by the dry vacuum pump generally indicated as D. The details of this pump form no part of the present invention and are not herein described. $D^1$ indicates a vacuum line extending from the filtrate receiver $C^{10}$, through the moisture trap $D^2$ to the pump D. $D^3$ is a filtrate line extending from the moisture trap to the line $C^1$.

E indicates a hopper to receive the discharge cake, which hopper may overlie or deliver to any suitable belt conveyor or other conveying or receiving means $E^1$.

Referring to the filter proper, G indicates a base or base plate structure provided with vertical supports $G^1$ herein shown as built up of angle iron. $G^2$ indicates any suitable brace plates. $G^3$ generally indicates a track grooved as at $G^4$, the track structure being suitably mounted upon the upright members $G^1$ with additional braces for example as at $G^5$.

Figure 4:
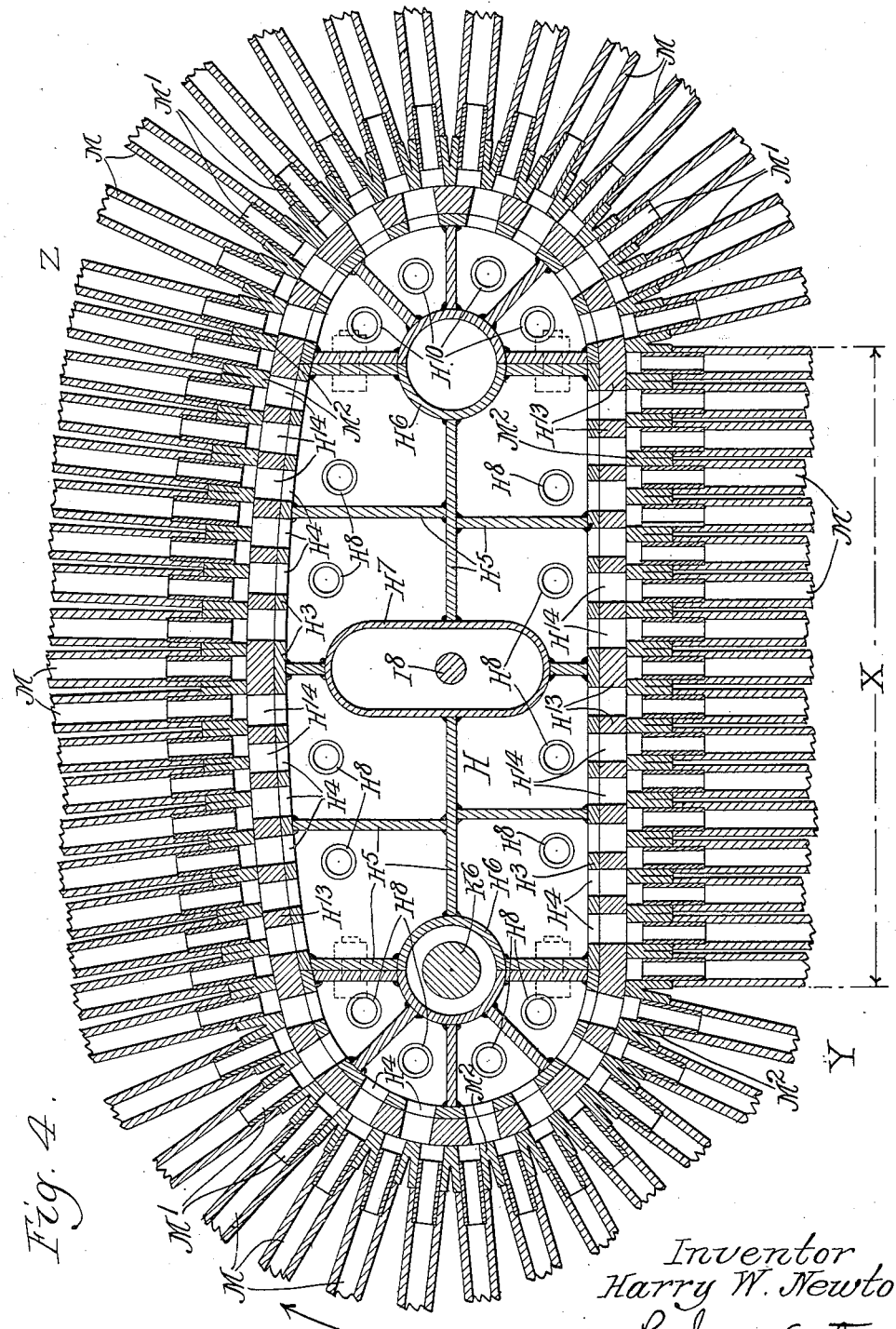
Figure 4 is a section on the line 4—4 of Figure 2.
Figure 5:
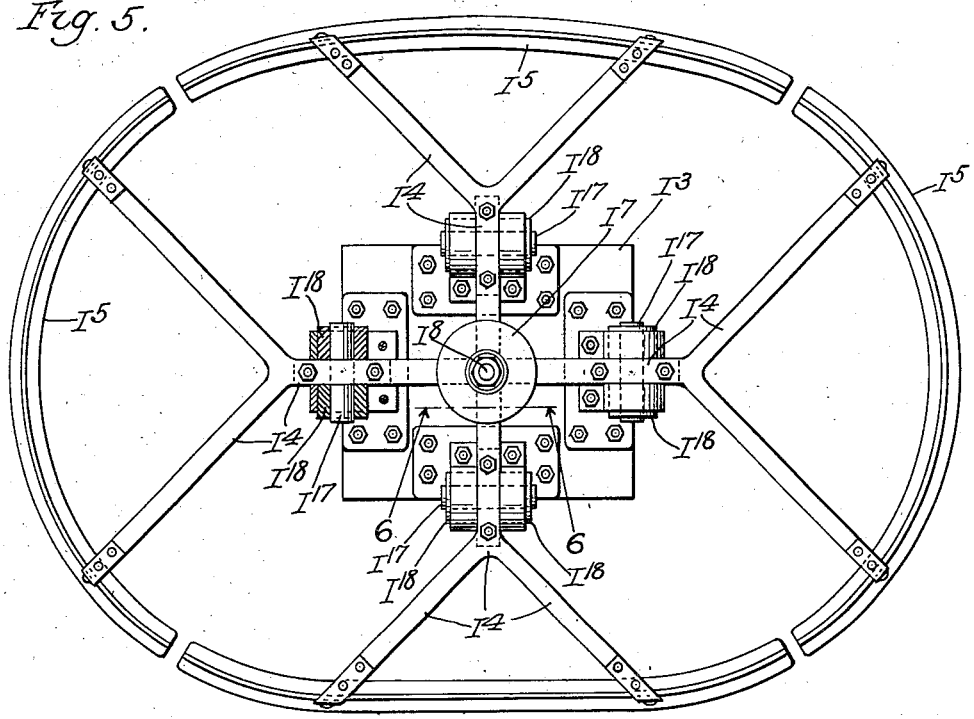
Figure 5 is a partial plan view.
Figure 6:
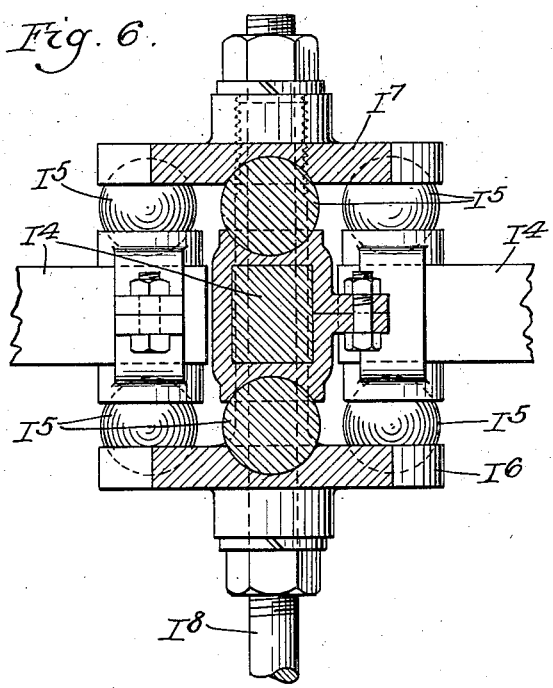
Figure 6 is a section on the line 6—6 of Figure 5.

Mounted on the members $G^1$ and braced in any suitable fashion, is a vacuum chamber member, generally indicated as H. It includes a top wall or walls $H^1$ and a bottom wall or walls $H^2$, and a ported peripheral or side wall $H^3$ provided with a plurality of apertures or ports $H^4$. $H^5$ indicates internal partition walls. Adjacent the ends of the members so formed are internal walls $H^6$, herein shown as circular in cross section, which bound apertures through the suction member. Intermediate the ends of the suction member is an additional inner wall $H^7$ which bounds a central aperture, through which a vibrating rod $I^6$ below described may pass. The various chambers formed by the partitions $H^5$ and bounded by said partitions and the walls $H^6$ and $H^7$ and the outer wall $H^3$, are provided with separate vacuum lines generally indicated as $H^8$. These may extend, for example, to the vacuum manifold C and may be controlled by individual valves or control means $H^9$. Referring to the compartments shown at the right end of Figure 4, these may be employed in connection with the discharge of the cake, in a manner later to be described. Therefore, one or more of these may be employed not as vacuum chambers, but may be subjected to air pressure or may be open to the atmosphere. I indicate, therefore, inlets or outlets $H^{10}$ which are independent of the vacuum system and may be controlled by the valves $H^{11}$. These passages $H^{10}$ may be associated with any suitable means for building up air pressure. Since such means are well known, they are not herein indicated in detail in the drawings, but I illustrate in Figure 1 diagrammatically the air compressor $H^{12}$, having the manifold $H^{15}$ to which the passages $H^{10}$ are connected. Secured against movement in relation to the peripheral wall $H^3$ is any suitable valve seat, generally indicated as $H^{13}$, which may be of rubber and which is ported as at $H^{14}$ in communication with the ports $H^4$.

I generally indicates a central support extending upwardly from the below described vacuum structure. Mounted upon it may be the upper track $I^1$ with its track grooves $I^2$ aligned with the lower tracks $G^3$ with their corresponding grooves $G^4$. The supports I also support transverse members $I^3$. Mounted upon the members $I^3$ are a plurality of vibrating arms $I^4$, one set of arms being mounted on each side of the machine, referring to the form shown in Figure 4. Said arms may be provided individually or in groups with contact members $I^5$, which may be in the form of segments or which conform to the path or arc described by the filter leaves, later described in detail, which are guided by the tracks $G^3$, $I^1$. The inner end of each arm $I^4$ is secured within a rubber ring or equivalent member $I^5$, these members being compressed between opposite collars or abutments $I^6$ $I^7$, mounted upon a rod $I^8$, which is shown and described as passing downwardly through the aperture or bounding wall $H^7$ to the vibratory mechanism. I illustrate, for example, a bearing housing $I^9$ with an exterior shaft $I^{10}$, having an eccentric $I^{11}$ which is surrounded by an eye $I^{12}$ at the lower end of the rod $I^8$. The shaft $I^{10}$ may be rotated as by the sheaves $I^{13}$, about which pass belts $I^{14}$ extending to the shaft of any suitable motor $I^{15}$, which carries corresponding sheaves $I^{16}$. The result of the rotation of said shaft $I^{10}$ is to impart a vertical or axial oscillation to the rod $I^8$, whereby the arms $I^4$ are vibrated. The individual arms $I^4$ are shown as mounted upon shafts $I^{17}$ about which are rubber bushings $I^{18}$, whereby the arms are cushioned from the supporting member during vibration. The bushings $I^{18}$ are held against rotation and are torsionally deformable. Therefore, as each arm $I^4$ is moved from neutral position in either direction, force is stored up which is returned, causing rapid acceleration and deceleration or snap action of the arms $I^4$.

Driven, for example by the motor $I^{15}$, through any suitable gearing or speed changing mechanism, generally indicated as K, is a pinion $K^1$ in mesh with the gear $K^2$ on the shaft $K^3$. The shaft $K^3$, from the bevel gears $K^4$ $K^5$, drives an upright shaft $K^6$ carrying the sprockets $K^7$, about which pass endless chains $K^8$ having individual links $K^9$. $K^{10}$ indicates another upright shaft, having associated therewith the idler sprockets $K^{11}$, about which the chain also passes, $K^{12}$ indicating suitable supporting sleeves, mounted for example, on the brackets $K^{13}$. Associated with the links $K^9$, and for example with each link, are the driving bars $K^{14}$. Each such bar penetrates the grooves $G^4$ and $I^2$, respectively, of the tracks $G^3$ and $I^1$, whereby the path of the chain is determined by the configuration of said tracks.

Each such driving bar $K^{14}$ has associated with it an outward extension or bracket M. The hollow of the bracket communicates by a metal nipple $M^1$ with a flexible valve belt $M^2$ which is supported thereby. The said belt $M^2$ is formed closely to engage and conform to the face of the fixed rubber valve member $H^{13}$, it being understood that the belt $M^2$ slides across the surface of the member $H^{13}$, the ports of the two members being adapted to communicate as the belt $M^2$ moves. Mounted on the upper face of each bracket M, and indicated as readily removable, is a member $M^3$, one end of which may be held, for example by the bolt $M^4$, and the opposite slotted end by the bolt $M^5$. Mounted upon this member $M^3$, as by the springs $M^6$, is a leaf structure, generally indicated as $M^7$. This structure is connected, as by the flexible passages $M^8$, with the interior of the bracket M, whereby the interior of the leaf is put into communication, suctional or otherwise, with the above described filter structure.

It will be understood that many variations may be made in the type of leaf and mounting of leaf, but I illustrate herein a practical form of leaf which may be used with my device. Referring to it in detail, the flexible passage $M^8$ may be so designed as to be flexible but non-collapsible under atmospheric pressure. In the form shown I have illustrated a solid rubber block with a plurality of individual passages $M^9$. The reflex springs $M^6$ support a circumferential metal frame $M^{10}$ which may be apertured at its upper side at $M^{11}$ to allow the contacts $N^9$ to protrude in opposition to the members or segments $I^5$, whereby the entire leaf structure may be vibrated.

Figure 3:
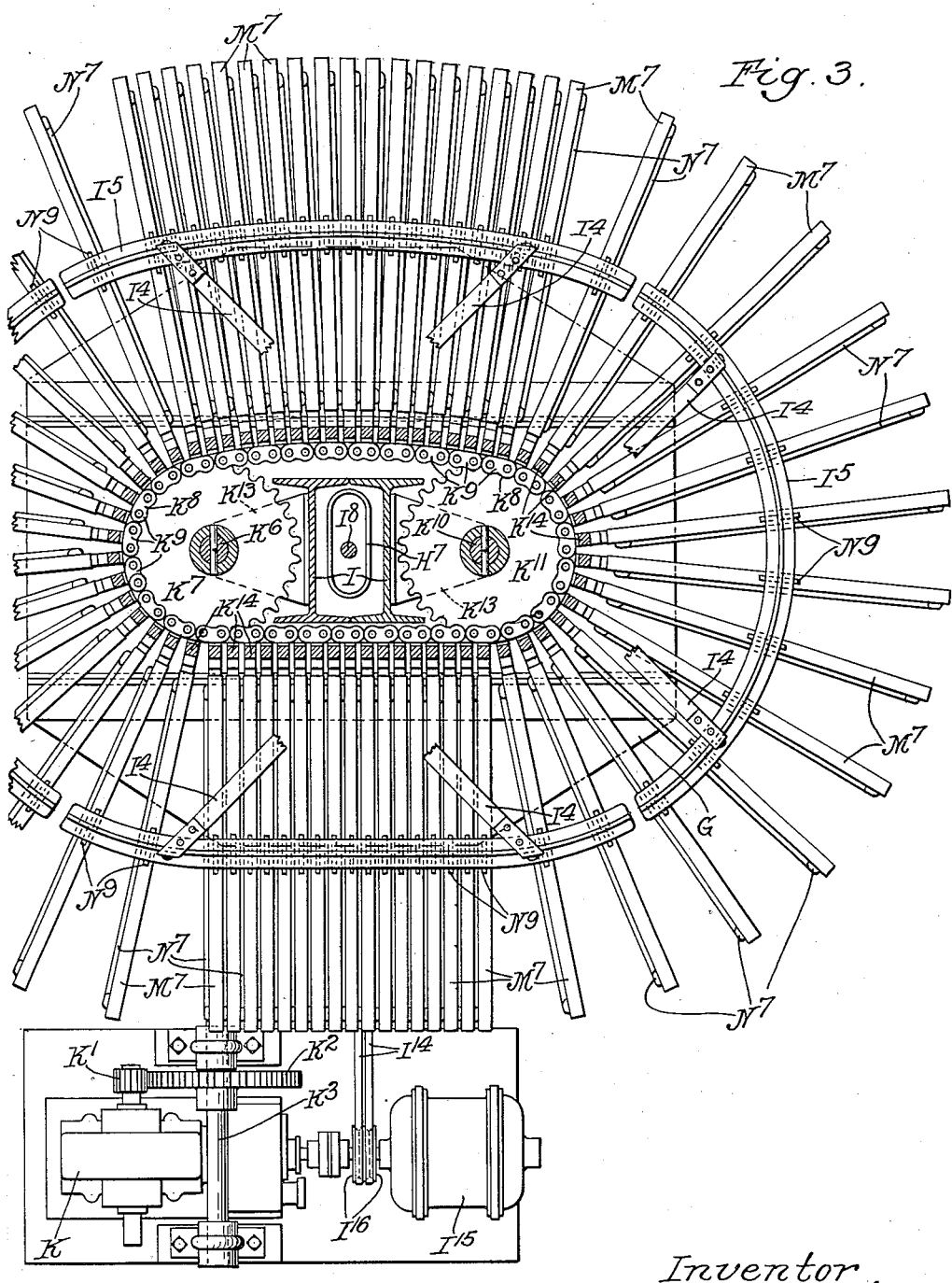
Figure 3 is a section on the line 3—3 of Figure 2.

In the operation of the device the leaves at one or more points in their circuit are in closely opposed and parallel relationship. In order to seal the leaves together to form a filling chamber, I may provide any suitable packing means between adjacent leaves to prevent the leakage of pulp from the chambers so formed. I do not illustrate the details of any such packing means, but the leaves are shown in closely approached position, as at the bottom of Figure 3 or Figure 4 and at the zone X of Figure 4. It will be understood that the leaves include abutting parts forming closed pockets or members open only at the top, which are broken as the leaves reach the zone Y.

It will be realized that whereas I have described and shown a practical and operative device, nevertheless many changes may be made in size, shape, number, relation and disposition of parts without departing from the spirit of my invention. Also modifications of design may be made to meet the problems involved in filtering of various materials. For example, I illustrate in Figures 8 to 12 variations of the mechanism shown in the earlier figures. Whereas, in the form of Figures 3 and 4, I illustrate a single set of driving sprockets and a single set of idler sprockets. I may employ additional sprockets to render the belt generally triangular in cross section, or quadrangular, or having a greater number of sides or corners. Such a multi-sided belt may be of advantage, for example in quick filtering or in quick drying materials, and I have, therefore, illustrated in the said figures filters, the leaves of which, in their closed path, may pass through a plurality of filtering zones. For example, in Figures 11 and 12, in the place of the single delivery chute or trough B² of Figure 1, I illustrate a plurality of such troughs, which may feed the liquid to the belt or to the leaves at a plurality of points. I give these variations as examples of the flexibility of adaptation of my device, and it will therefore be realized that I wish my description and drawings to be taken as in a broad sense illustrative, rather than as limiting me to the particular device or devices herein shown.

The use and operation of my method or process are as follows:

Referring for example to Figure 1, any suitable means may be provided for maintaining a flow of the material to be filtered. I illustrate a storage tank B with a delivery trough B², but any other suitable means may be employed for supplying and controlling the liquid. In the normal use of the device herein shown, the leaves and the tracks are so shaped and proportioned that along one or more zones, for example the zone illustrated as X in Figure 4, the leaves take a parallel position in close approach to each other. The U-shaped gaskets N⁷ seal the space between adjacent leaves so that each space is in effect an open-topped container into which the fluid to be filtered flows. As the leaves pass through the zone of fluid delivery, the septum or cloth N³ on each side of each such container is subjected to the fluid. At the same time suction is maintained from the passages H⁸ in communication with the suction manifold C. This suction serves to draw the liquid from the filtering medium and results in the formation of a cake of solids on the outside of each cloth N³. As the leaves pass in their path beyond the limits of the straight suction X, the seal between adjacent leaves is broken, the members N⁷ being no longer effective to maintain a closed compartment. Whatever liquid has not already been drawn through the leaf may then fall into the hopper B³ for return by the pump B⁵ to the storage tank B.

I find it advantageous to vibrate the individual leaves during the drying of the cake. The cake is subjected to the atmosphere when the individual leaves separate, for example at the initial zone of separation, starting at the point marked Y in Fig. 4. The suction is meanwhile maintained so that atmospheric air is drawn through the cakes, tending to dry them. During this drying process the vibration of the arms I⁴ is effected to vibrate the leaf structure in a generally vertical plane. I illustrate, for example, a downward tapping against the leaf from the recurved spring M⁶, cushioning the vibration and preventing vibration of the bracket M. This vibration results in rapid drying and compacting of the cake in accordance with the method illustrated in co-pending application No. 555,275, filed August 5, 1931, in the name of Harry W. Newton, and assigned to the assignee of the present application. The vibration and suction may be maintained any suitable distance, for example all the way to the point indicated as Z in Fig. 4. As an illustration, I may cut off the suction altogether from Z to the initiation of the X space of liquid delivery while maintaining vibration. During the drying stage the suction holds the cake against the surface of the cloth N³ even though the leaf is being vibrated. When the suction is cut off, and assuming that the vibration is continued, the vibration tends to free the cake from the leaf, and this tendency is not resisted by suction. Therefore, the cake sloughs off in the discharge zone at the right end of the structure of Fig. 4 and is received in the hopper E for any suitable disposal.

Whereas I have described as a typical cycle the maintenance of vibration continuously from Y to the end of the delivery zone, it will be understood that vibration may be interrupted at any desired point or points. However, as long as a leaf is being vibrated, it should also be under suction until discharge is desired, because vibration without suction will disturb or discharge the cake. The length of the path taken by an individual leaf during its cycle may vary a great deal, depending on the liquids and materials filtered. Some materials dry much faster than others, and hence the possibility of effecting more than one sequence of cake formation, cake drying and cake discharge on a given circuit.

From the foregoing it will be clear that my method includes some one or more of the following steps, namely, the vibration of septum and cake during cake formation, the vibration of septum and cake after the cake is formed, but prior to the discharge of the cake, and, finally, the vibration of the cake at the time of discharge, or in order to discharge it or assist in its discharge. In the particular mechanism shown, corresponding to the mechanism of co-pending Butler application No. 563,769, unitarily operable means are shown for vibrating the leaves throughout substantially the entire sequence or course of movement of the filtering operation. However, it will be understood that this indicates merely one suitable mechanism. I may, for example, dispense with vibration at one or more zones and employ vibration through only a part of the zones of treatment. I may vibrate only at and for discharge. On the other hand, I may vibrate only to compact or dry the cake and employ other means for cake discharge. It will also be understood that while I have described my method as applied to a process of filtration carried out by the circulation of filter leaves through a closed path, I do not wish to be limited in the use of my invention to any such restricted field. My method is applicable to other types of mechanism for filtering or otherwise treating mixed liquids and solids.

It will be understood that in connection with the sequence of steps above described under many circumstances it may be desirable, after the termination of the suction and prior to the discharge of the cake by vibration, to subject the septum and cake to pressure employing for example the pump H¹² as shown in Figure 1. This may have for effect to inflate the septa either for the purpose of deforming the cake or for cleansing the cloth of the septa. For example, after the termination of the suction, if air under pressure is admitted to the interior of the septum, it will deform the septum by blowing its faces out. This tends to break the seal between the cake and the septum, to loosen the cake from the cloth and to clean the cloth of particles which impregnate the cloth or septum.

I claim:

1. The method of filtering which includes moving a plurality of filter leaves through a closed path, directing a fluid to be filtered in contact with said filter leaves at a plurality of zones positioned along said path forming a cake on said filter leaves and rapidly vibrating the leaves and cakes during formation thereof and thereafter removing the filter cake from the filter leaves intermediate said zones.

2. The method of filtration which includes the formation of a cake upon a septum and the rapid vibration of the septum and cake during cake formation.

3. The method of filtration which includes the subjection of a septum to a liquid containing solids, the maintenance of a pressure differential on opposite sides of said septum, and the formation of a cake upon said septum in response to said pressure differential, and the rapid vibration of the septum and cake during cake formation.

4. The method of filtration which includes the subjection of a septum to a liquid containing solids, the maintenance of a pressure differential on opposite sides of said septum, and the formation of a cake upon said septum in response to said pressure differential, and the rapid bodily oscillation of the septum and cake during cake formation, the removal of said septum from subjection to the liquid, and the bodily oscillation of septum and cake after said removal.

5. The method of forming a filter cake which includes moving a septum through a body of liquid, subjecting it, while in said body of liquid, to a differential pressure and thereby causing the deposition on said septum of a cake of particles from said liquid, and imparting bodily oscillation to said septum and cake while they are subjected to said liquid, and removing said septum and cake from the liquid and thereafter imparting bodily oscillation to them while maintaining said differential pressure, and terminating said differential pressure and thereafter imparting bodily oscillation to septum and cake.

HARRY W. NEWTON.